US007895520B1

(12) United States Patent
Doyle et al.

(10) Patent No.: US 7,895,520 B1
(45) Date of Patent: Feb. 22, 2011

(54) METHODS AND APPARATUS FOR MANAGING SCHEDULED ACTIVITIES IN A STORAGE AREA NETWORK

(76) Inventors: Serena M. Doyle, 41 Saddle Hill Rd., Hopkinton, MA (US) 01748; Hanna Yehuda, 14 Selwyn Rd., Newton, MA (US) 02461; Ethan D. Roberts, 10 Pearl St., Natick, MA (US) 01760; Eyal Kedem, 14 Town House Dr., Newton, MA (US) 02460

( * ) Notice: Subject to any disclaimer, the term of this patent is extended or adjusted under 35 U.S.C. 154(b) by 569 days.

(21) Appl. No.: 11/324,842

(22) Filed: Jan. 3, 2006

(51) Int. Cl.
*G06F 3/00* (2006.01)
(52) U.S. Cl. .................. 715/738; 715/733; 715/734; 715/735; 715/839
(58) Field of Classification Search ............... 715/733, 715/734, 735, 839; 705/8
See application file for complete search history.

(56) References Cited

U.S. PATENT DOCUMENTS

| | | | |
|---|---|---|---|
| 6,470,384 B1* | 10/2002 | O'Brien et al. | 709/223 |
| 6,507,836 B1* | 1/2003 | Nose et al. | 707/3 |
| 6,812,994 B2* | 11/2004 | Bubie et al. | 352/40 |
| 7,107,534 B1* | 9/2006 | de Jong et al. | 715/734 |
| 7,640,264 B1* | 12/2009 | Chaulk et al. | 1/1 |
| 7,721,211 B1* | 5/2010 | Yehuda et al. | 715/734 |
| 2003/0146929 A1* | 8/2003 | Baldwin et al. | 345/733 |
| 2003/0233427 A1* | 12/2003 | Taguchi | 709/220 |
| 2004/0085347 A1* | 5/2004 | Hagarty et al. | 345/735 |
| 2004/0267595 A1* | 12/2004 | Woodings et al. | 705/9 |
| 2005/0065805 A1* | 3/2005 | Moharram | 705/1 |
| 2006/0085790 A1* | 4/2006 | Hintermeister et al. | 718/100 |

OTHER PUBLICATIONS

IBM Technical Support Organization, "IBM Tivoli Storage Manager: Version 5.3 Technical Guide," Mar. 2005, Selected pp. 4, 7, 61-67, 133, 188.*

* cited by examiner

*Primary Examiner* — Sara England
(74) *Attorney, Agent, or Firm* — Krishnendu Gupta; Gerald P. Kazanjian (57) ABSTRACT

A SAN activity scheduler provides an integrated view of various types of scheduled activities, provides a summary report of multiple scheduled activities, and provides a seamless interface to drill down into specific details of scheduled activities. The scheduler provides a layout view of the scheduled activities arranged according to activity type (tasks, data collection, or retention) or status (success or failure), a detailed layout of activities scheduled within a particular day or other time interval, and a drill down detail which provides activity specific reports such as logs and collection details about the scheduled activities. In this manner, the scheduler provides the SAN operator with an integrated, all-inclusive interface for directing scheduled activities, presents a unified cohesive interface for quickly assessing the current state of scheduled activities, and drilling down into details on an activity specific basis without leaving the integrated scheduler application.

17 Claims, 8 Drawing Sheets

METHODS AND APPARATUS FOR MANAGING SCHEDULED ACTIVITIES IN A STORAGE AREA NETWORK

BACKGROUND

In a storage area network (SAN), a SAN management application monitors and manages manageable entities in the SAN. The manageable entities include storage arrays, connectivity devices, and hosts. Typically, software components known as agents execute on the hosts for gathering, reporting, and monitoring the manageable entities in the SAN. The manageable entities are responsive to the agents and report various status metrics back to the agents, and receive control information from the agents. A management server executes the SAN management application, and oversees the agents. The management server also connects to a console having a graphical user interface (GUI) for receiving and displaying operator parameters with a SAN operator.

The SAN is therefore an interconnection of manageable entities operative to provide mass data storage and retrieval services to a user community. In the SAN, various data collection and reporting operations occur at various times. Some of these operations occur at regular intervals, and others are operative on a demand basis. Such operations may include backups, reconfiguration, administrative reports, and other operations concerned with the operation and maintenance of the SAN. In a large SAN, such operations can be voluminous and frequent, and are often executed in a batch, or offline mode and/or at off hours (i.e. overnight) so as to minimize interference with optimal SAN performance.

SUMMARY

In a conventional storage area network, a multitude of administrative operations occur at various times to facilitate the ongoing SAN infrastructure. Such administrative and maintenance based operations typically occur at a variety of times, and with recurring frequency. Accordingly, a conventional SAN employs a scheduler for scheduling administrative and maintenance operations. Unfortunately, conventional schedulers suffer from several deficiencies. A conventional scheduler is generic to scheduled operations and provides only minimal qualitative feedback about the scheduled item, such as performance, entities affected, etc. Further, such schedulers typically execute separately or invoke additional applications to perform the requested scheduling and generate appropriate feedback. Such additional executable instances increase response time and resources required for managing scheduled operations, increase complexity of the scheduling process, and complicate the interface between the SAN management application and the conventional scheduler.

It would be beneficial to provide a SAN activity scheduler directly within the SAN management application which provides an integrated view of various types of scheduled activities, provides a summary report of multiple scheduled activities, and provides a seamless interface to drill down into specific details of scheduled activities. Accordingly, configurations herein substantially overcome the above described deficiencies of conventional schedulers by providing a SAN activity scheduler for scheduling a variety of SAN activities in a common integrated graphical user interface (GUI), which presents an integrated overview layout of schedules activities and corresponding status, and further provides a seamless drill down interface into activity specific details for multiple types of scheduled activities, therefore providing SAN specific details not available in conventional schedulers. The scheduled activities may include, for example, tasks, data collection (DC) policies, and retention policies (RET). The scheduler provides a layout view of the scheduled activities arranged according to activity type (tasks, data collection, or retention) or status (success or failure), a detailed layout of activities scheduled within a particular day or other time interval, and a drill down layout which provides activity specific reports such as logs and collection details about the scheduled activities, such as logs, commands associated with the tasks as well as any failure information which may be associated with the task. Each of the activity types (tasks, data collection and retention) is handled by the scheduler GUI application, avoiding invocation of an external application or scheduler for monitoring and managing the scheduled activities.

In this manner, the scheduler provides the SAN operator with an integrated, all-inclusive interface for directing scheduled activities from within the SAN management application, presents a unified cohesive interface for quickly assessing the current state of scheduled activities, and drilling down into details on an activity specific basis without leaving the scheduler application. In the exemplary configuration, the scheduler is a part of the SAN management application, thus relieving the user of integration between the management application and scheduler products, and therefore no information sharing necessary since it is all accessible from within the exemplary scheduler. The scheduler is particular suitable to provide scheduling of storage management activities pertaining to the manageable entities of the SAN, and responsive to the SAN management application. It provides a user, for example, the ability to examine a Storage Array or a Host and quickly ascertain if it may be overloaded with too many activities for a specific time frame. It also allows the user the ability to get detailed information about the scheduled job from within the same SAN management application.

In further contrast, conventional schedulers, which may, for example, be employed with other conventional storage management applications, implement non-selective approaches which allow scheduling of any type of activity, and may not be particularly amenable to manageable entities in a storage area network. One potential drawback to such conventional applications is that they do not provide a way to get details of the scheduled job or the reason for failures from within their application, in contrast to the drill down detail screen discussed further below.

In further detail, the method for viewing scheduled activities as disclosed herein includes receiving a user selection indicative of a set of manageable entities in a storage area network, and receiving a selection filter indicative of qualitative attributes of activities, in which the activities are scheduled for performing a predetermined set of instructions concerning the set of manageable entities. Receiving the selection filter further includes selecting the type of activity and the status of the activity. The scheduler employs a GUI to present, to the requesting user, an overview layout having summary depictions of activities corresponding to the selection filter for scheduling intervals over a predetermined reporting range. From the overview layout, the GUI receives a detail selection indicative of a particular one of the scheduling intervals of activities corresponding to the selected interval. The detail selection is indicative of a filtered set of activities derived from the received selection filter. The GUI display presents a detail layout having a set of entries corresponding to the selected interval, such that the detail layout has an entry for each activity in the summary depiction corresponding to the selected interval, in which each of the detail layout entries is operable for receiving a detail command requesting an activity detail of the particular activity corresponding to the entry receiving the detail command.

In the exemplary configuration, the GUI displays a display tree of the set of manageable entities concurrently with the overview layout, in which the overview layout includes a calendar selection of the summary depictions, and each of the summary depictions is indicative of scheduled activities on a particular day. The display tree lists an expandable hierarchy of the available manageable entities for which activities have been scheduled. Presenting the overview layout further includes displaying, for each summary depiction, a synopsis icon indicative of collective qualities of the grouped activities. In the exemplary configuration, the scheduler further receives an interval refinement indicative of a time interval for which to display activities, such as alternate data and time ranges.

The exemplary GUI displays each entry in the detail layout as a line item, such that each line item includes, for the activities corresponding to the selection filter, detail fields. Each entry of the set of entries is a line item corresponding to an activity having an activity type, in which the activity types including at least one of a task, retention period, or collection policy. The GUI groups the entities according to at least one of activity type and status.

The detail layout allows the scheduler to receive an activity selection for an activity specific detail of the selected activity, and to display the selected activity specific detail in an activity independent manner that avoids the native application corresponding to the activity, thus avoiding a complex invocation of activity specific scheduling applications for achieving the drill down view. The resulting activity specific detail includes at least one of displaying task logs, retention criteria parameters, and data collection policies.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein present a seamless interface which provides detailed information about scheduled activities for the manageable entities in a SAN, such as tasks, data collection policies and retention policies. In contrast to conventional schedulers, the scheduler GUI application presented herein displays a layout overview of summary information, a detailed layout of scheduled activities arranged by type and status, and a drill down view for gathering activity specific details about the scheduled items. Therefore, the SAN activity scheduler disclosed herein provides an integrated view of various types of scheduled activities, provides a summary report of multiple scheduled activities, and provides a seamless interface to drill down into specific details of scheduled activities. Accordingly, configurations herein substantially overcome the above described deficiencies of conventional schedulers by providing a SAN activity scheduler for scheduling a variety of SAN activities in a common integrated graphical user interface (GUI), which presents an integrated overview layout of scheduled activities and corresponding status, and further provides a seamless drill down interface into activity specific details for multiple types of scheduled activities.

The scheduled activities may include, for example, tasks, data collection (DC) policies, and retention policies (RET). The scheduler provides a layout view of the scheduled activities arranged according to activity type (tasks, data collection, or retention) or status (success or failure), a detailed layout of activities scheduled within a particular day or other time interval, and a drill down detail which provides activity specific reports such as logs and collection details about the scheduled activities. Each of the activity types (tasks, data collection and retention) is handled by the scheduler GUI application, avoiding invocation of an external application or scheduler for monitoring and managing the scheduled activities. In this manner, the scheduler, by being included within the SAN management application, provides the SAN operator with an integrated, all-inclusive interface for directing scheduled activities, and presents a unified cohesive interface for quickly assessing the current state of scheduled activities, and drilling down into details on an activity specific basis without leaving the scheduler application, for example, to invoke an external conventional scheduler application.

Figure 1:
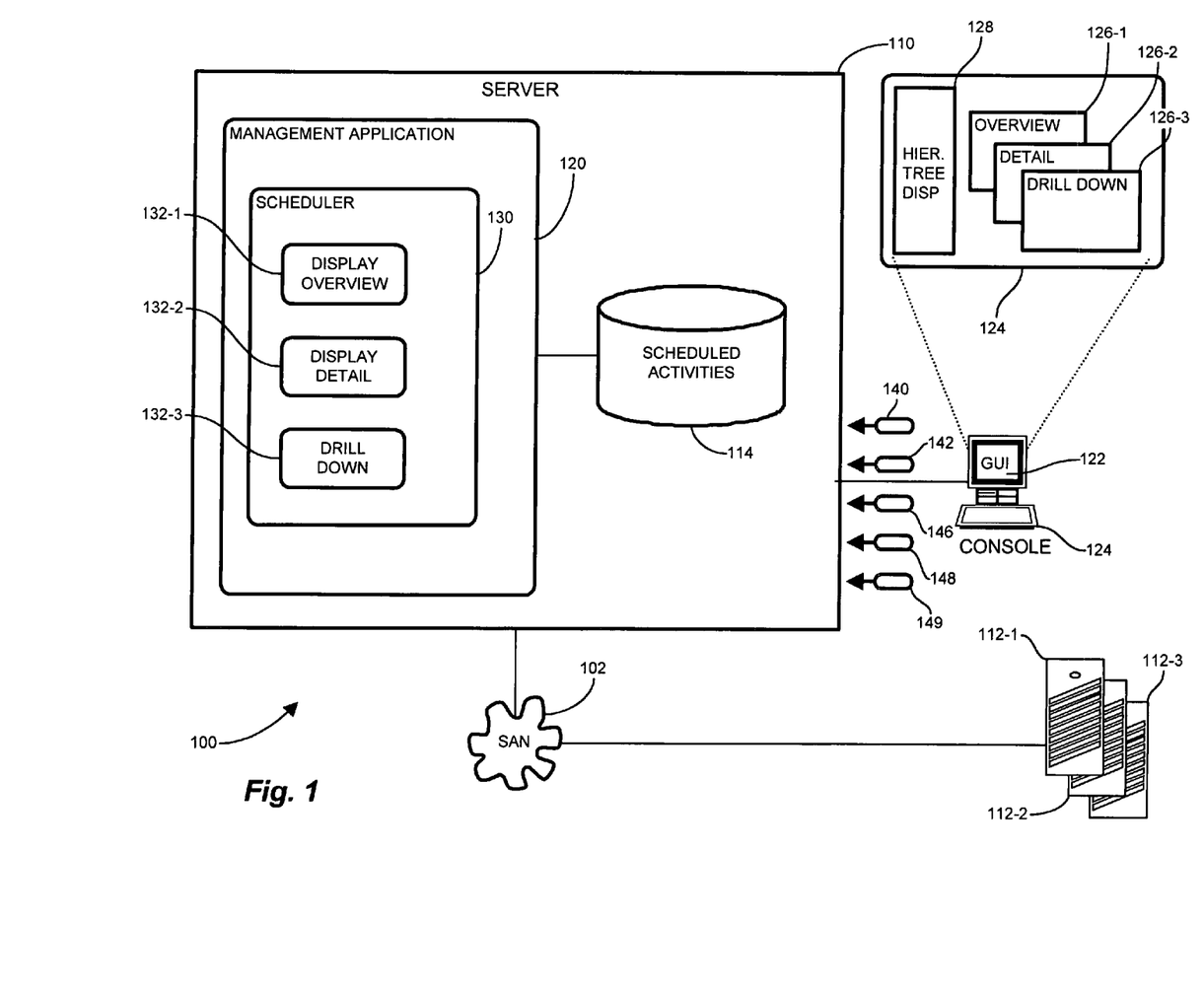
FIG. 1 is a context diagram of an exemplary managed information environment suitable for use with the present invention.

FIG. 1 is a context diagram of an exemplary managed information environment suitable for use with the present invention. Referring to FIG. 1, the managed information environment 100 includes a server 110 connected to a storage area network (SAN) 102 having a plurality of interconnected manageable entities 112-1 . . . 112-N. The interconnected manageable entities 112, which may include, for example storage arrays, connectivity devices and hosts, provide data storage and retrieval services to a user community. The server 110 executes a SAN management application 120 responsive to a graphical user interface 122 on a console 124. The GUI has a display screen 124 operable to display a plurality of display windows 126-1 . . . 126-N (126 generally) for interactive I/O (input/output) with a user or operator (not specifically shown). The display screen 124 also includes a hierarchical expandable tree display 128 for identifying a selected set of manageable entities 112. In the exemplary configuration, the SAN management application may be the EMC Control Center (ECC) application, and the manageable entities include Symmettrix® storage arrays, both marketed commercially by EMC Corporation of Hopkinton, Mass.

In accordance with configurations of the invention disclosed herein, the management application 120 includes a scheduler 130. The scheduler 130 is operable to schedule a variety of activities concerning the administration (i.e. operation and maintenance) of the storage area network 102. The scheduler 130 stores a plurality of scheduled activities 114, including tasks, data collection policies, and data retention policies (discussed further below) which are operable or executable at predetermined times as scheduled by the scheduler 130. The scheduler 130 employs several modules 132-1 . . . 132-N (132, generally), including a display overview module 132-1, a display detail module 132-2 and a drill down module 132-3. The modules 132 correspond to, and are operable to, each display respective display windows 126 on the GUI display screen 124. The display overview module 132-1 displays the overview window 126-1, which includes an overview layout of status icons (discussed further below) indicative of a status summary (i.e. count) of activities by type or status result (i.e. success of failure). The display detail module 132-2 displays the detail display window 126-2, which shows a set of activities selected in the overview, typically for a particular day. The drill down module 132-3 displays the drill down display window 126-3 activity specific details about an individual selected activity from the detail display window 126-2, also discussed further below. Such activity (i.e. scheduled job) details allow the user to review in-depth details about the scheduled activity without leaving the SAN management application. The drill down module 132-3, therefore, allows the user to see all objects (i.e. other manageable entities) impacted by the tasks, the logs, commands associated with the tasks (i.e. activity) as well as any failure information which may be associated with the task. Further, for data collection policies, you can also see reason for failure, if applicable, along with all objects which are associated with the data collection policy which was run.

Figure 2:
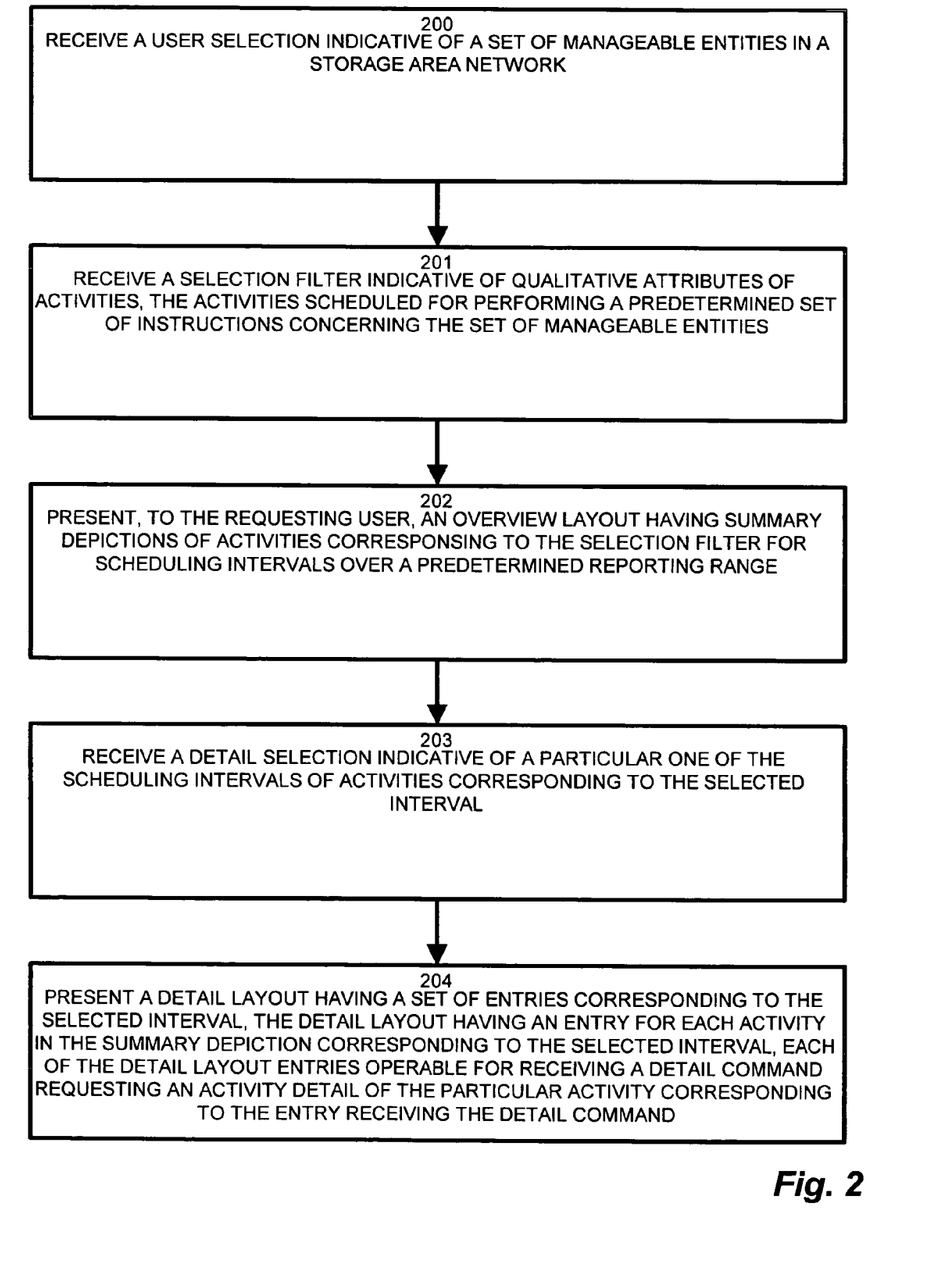
FIG. 2 is a flowchart of scheduler operation in the environment of FIG. 1.

FIG. 2 is a flowchart of scheduler operation in the environment of FIG. 1. Referring to FIGS. 1 and 2, the method for viewing scheduled activities in a storage area network as disclosed herein includes receiving a user selection 140 indicative of a set of manageable entities 112 in the storage area network 102, as depicted at step 200, and receiving a selection filter 142 indicative of qualitative attributes of scheduled activities, as shown at step 201. The user selection 140 is performed by the hierarchical expandable tree display 128 that lists the available manageable entities 112 in the SAN 102. The scheduled activities are operable to perform a predetermined set of instructions concerning the set of manageable entities 112, such as a software script, component, object or other executable entity. In the exemplary configuration, the scheduled activities include tasks, data collection, and retention operations, discussed further below. A task is an executable entity or other set of instructions for performing manipulations in the SAN. A task may also include subtasks. A task might be executed, for example, to perform a report, reconfiguration, or installation of a manageable entity in the SAN. The task may be recurring (i.e. rescheduled on a periodic basis) or a unitary occurrence. Data collection (DC) activity refers to archiving and backup specified by the data collection policy. Such activities typically recur on a regular basis, such as nightly or weekly. Retention policy refers to purging and/or offloading of older data to maintain optimal access to more recent data. Since older data tends to be less likely to be accessed, the retention policy typically defines an interval after which certain data should be offloaded to a secondary source.

Each of the supported activities corresponds to an activity type. In the exemplary configuration, the activities are the above outlined tasks, data collection, and retention activities. Alternate configurations may employ other activities. Further, a particular activity has a status indicative of success or failure of the activity. The selection filter 142 is indicative of the type and status of the activities for which information is sought.

The scheduler 130, at step 202, presents, to the requesting user, an overview layout 126-1 having summary depictions 506 (FIG. 4, below) of activities for the selected manageable entities corresponding to the selection filter 142 for scheduling intervals over a predetermined reporting range. The overview layout 126-1 may present, for example, a calendar format having scheduling intervals of days over a reporting range of a month. From the overview layout 126-1, discussed further below, a user selects a detail selection 146 indicative of a particular one of the scheduling intervals of activities corresponding to the selected interval, as depicted at step 203.

At step 204, the scheduler 130 presents a detail layout 126-2 having a set of entries corresponding to the selected interval, such that the detail layout 126-2 has an entry for each activity in the summary depiction 505 corresponding to the selected interval. Each of the detail layout entries is further operable for receiving a detail command 148 requesting an activity detail of the particular activity corresponding to the entry receiving the detail command 148. The detail command 148 results in an activity specific drill down display 126-3, showing further information such as log files or parameters concerning the particular manageable entity 112, also discussed further below.

Figure 3:
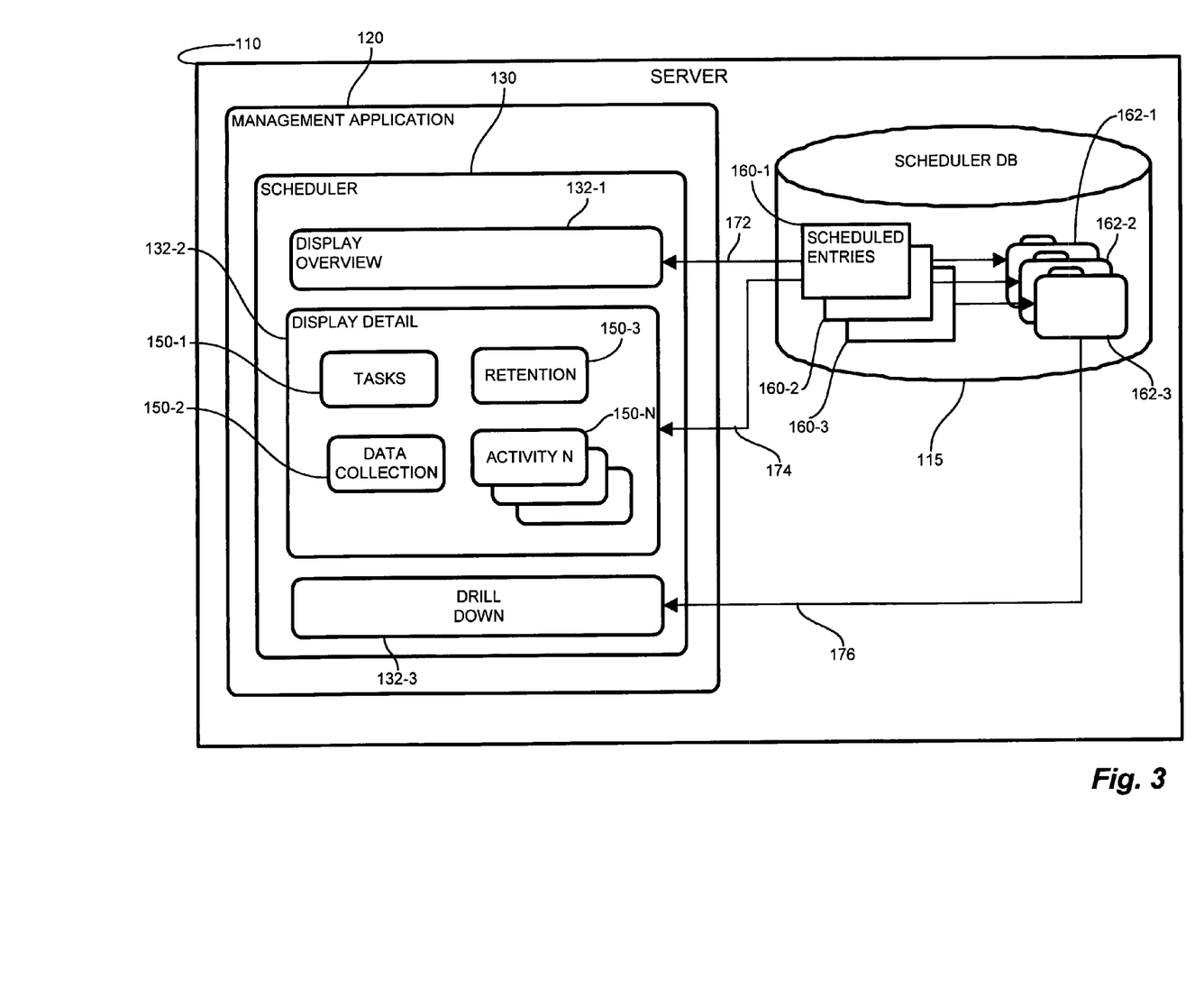
FIG. 3 is a block diagram of the scheduler in a storage area network (SAN) in an environment such as in FIG. 1.

FIG. 3 is a block diagram of the scheduler 130 in a storage area network (SAN) 102 in an environment such as in FIG. 1. Referring to FIGS. 1 and 3, in the exemplary configuration the scheduled activities 114 are stored in a scheduler database 115. The scheduler database 115 stores a plurality of scheduled entries 160-1 . . . 160-N (160 generally) each corresponding to a scheduled activity and indicative of when the scheduled activity is to execute, or activate. Each of the scheduled entries 160 is further associated with a detail file 162-1 . . . 162-N, which may include logs, status details, errors, or other details associated with the particular activity, as shown by arrows 170.

In the scheduler 130, the display overview module 132-1 presents the overview display 126-1 by retrieving the scheduled entries 160 matching the selection filter 142 as shown by arrow 172. The display detail module 132-1 includes activity components 150-1 ... 150-N (150 generally) for displaying scheduled entries 160 of each activity type, as shown by arrow 174. A task component 150-1 displays task entries 160, a data collection component 150-2 displays data collection entries 160, and a retention component 150-3 displays retention policy entries 160. Additional components 150-N may also be included to display scheduled entries 160 corresponding to other activity types. The scheduler also includes a drill down module 132-3 for displaying the drill down display 126-3 corresponding to the activity detail selection 148. The drill down module 132-3 receives activity specific data 162 for the selected activity, as shown by arrow 176. Each of the display windows 126 is discussed in further detail below with respect to screen shot FIGS. 4 and 5.

Figure 4:
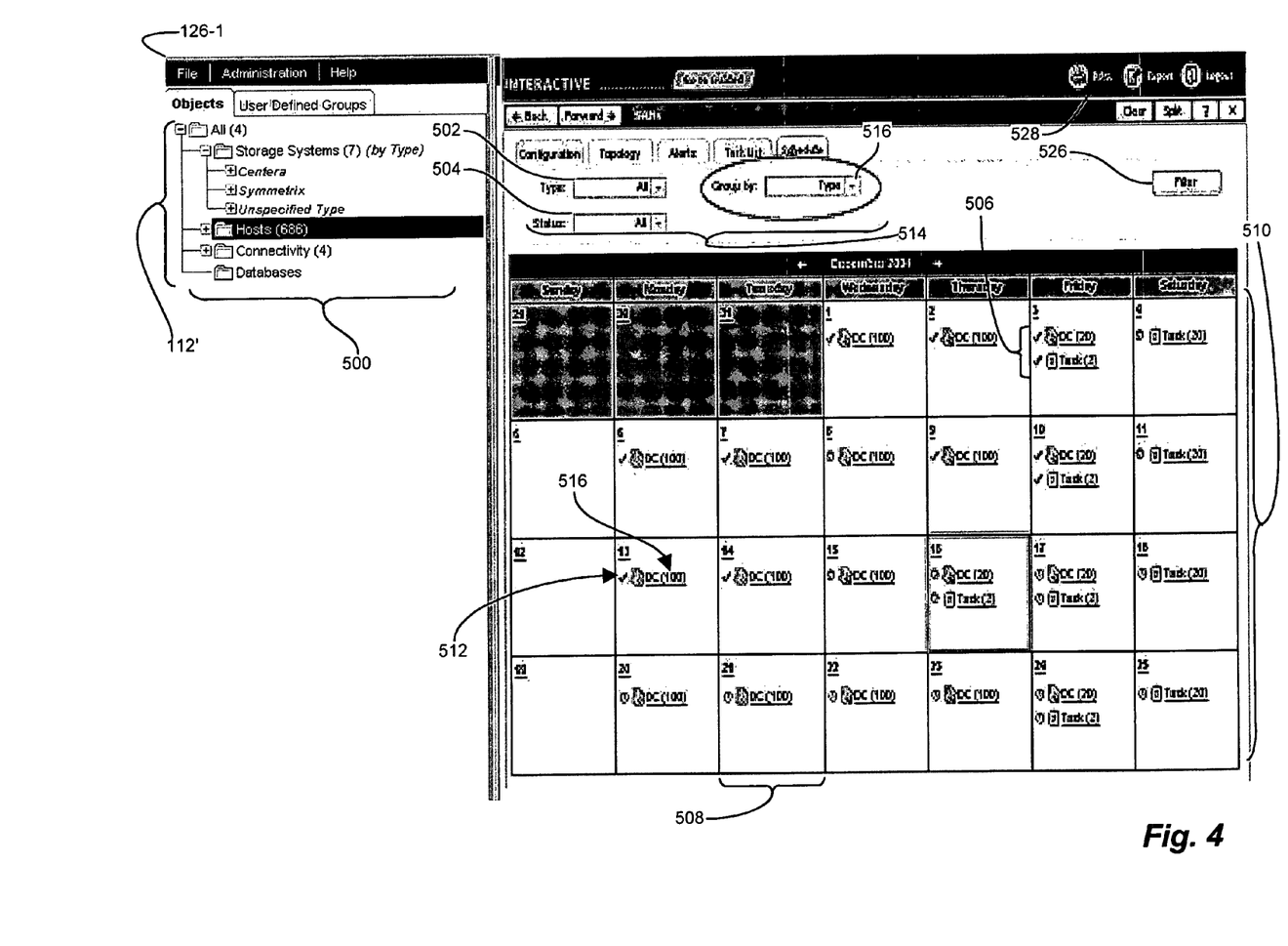
FIG. 4 is a graphical user interface (GUI) screen of the overview layout displayed by the scheduler of FIG. 3.

FIG. 4 is a graphical user interface (GUI) screen of the overview layout displayed by the scheduler of FIG. 3. Referring to FIG. 4, the display screen 124 shows the overview layout 126-1. The overview layout 126-1 includes a calendar selection 510, having a plurality of display intervals 508 (e.g. days) shown in a calendar format. In the exemplary configuration, the display interval is a day, however other intervals may be employed. A selection filter window 514 allows specification of the selection filter 142. The selection filter window includes a type pulldown 502 for selecting the activity type, and a status pulldown 504 for selection the activity status. In the exemplary configuration, the activity types include tasks, data collection policy (DC) activities, and retention policy (RET) activities, although alternate configuration may include other types. The status values enumerate success or failure of the activity in question, although other values (i.e. in progress) may be employed. A group by pulldown 516 provides, for the selected activities, grouping by either type or status. Therefore, an operator may select all activities of type task, and then group them by status, for example. An apply/refresh button 526 is responsive to changes in the selection filter 142 window 514 to apply or refresh the current view based on new selection filter input. An export button 528 is operable to export the selected data to an external application, such as Microsoft® Excel, for example.

The calendar selection 510 displays, for each display interval 508, the selected activities (based on the selection window 514) grouped according to grouping criteria in pulldown 516. The overview display 126-1 displays a summary depiction 506 in each display interval 508 of the selected activities according to the display selection filter 142 (from selection window 514). The summary depiction 506 includes a count 516 of the activities in the display interval 508 and a synopsis icon 512 indicative of the aggregate status of the activities.

Figure 5:
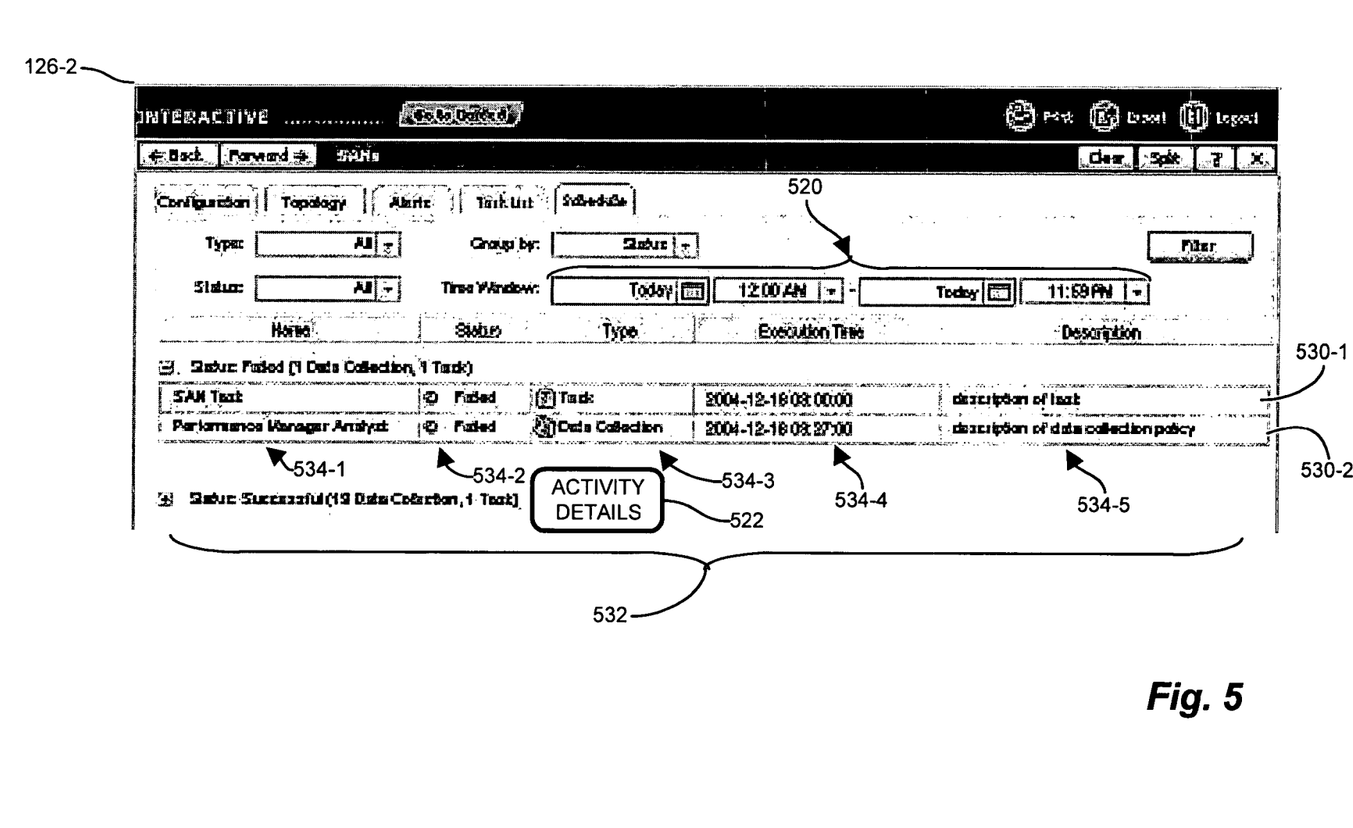
FIG. 5 is a GUI screen of the detailed layout displayed by the scheduler of FIG. 3.

FIG. 5 is a GUI screen of the detail layout 126-2 displayed by the scheduler 130 of FIG. 3. Referring to FIGS. 3-5, the detailed layout 126-2 displays line item entries 530-1 ... 530-N (530 generally) for the scheduled entries 160 selected in the summary depiction 506 on the overview display 126-1. For each entry 530, the scheduler displays a detail field set 532 including detail fields 534-1 ... 534-N (534 generally) listing specific parameters of the selected activities. In the exemplary configuration, the detail fields 534 include task name 534-1, status 534-2, type 534-3, execution time 534-4 and description 534-5. Other detail fields may be employed in alternate configurations.

From the detail layout 126-2, a selection filter refinement, task drill down display 126-3, or an interval refinement 520 are selectable. The interval refinement 520 allows date and time selection of the interval window of activities to include in the detail display 126-2. The refined interval may broaden or narrow the initial interval (day) selected from the overview layout 126-1, and need not even include the same day. The drill down display 126-3 is selectable by clicking on the entry 530 corresponding to the desired activity, and then selecting activity details 520. The drill down display 126-3, depending on the type of activity, is displayed from the detail files 162, providing further activity specific information.

Figure 6:
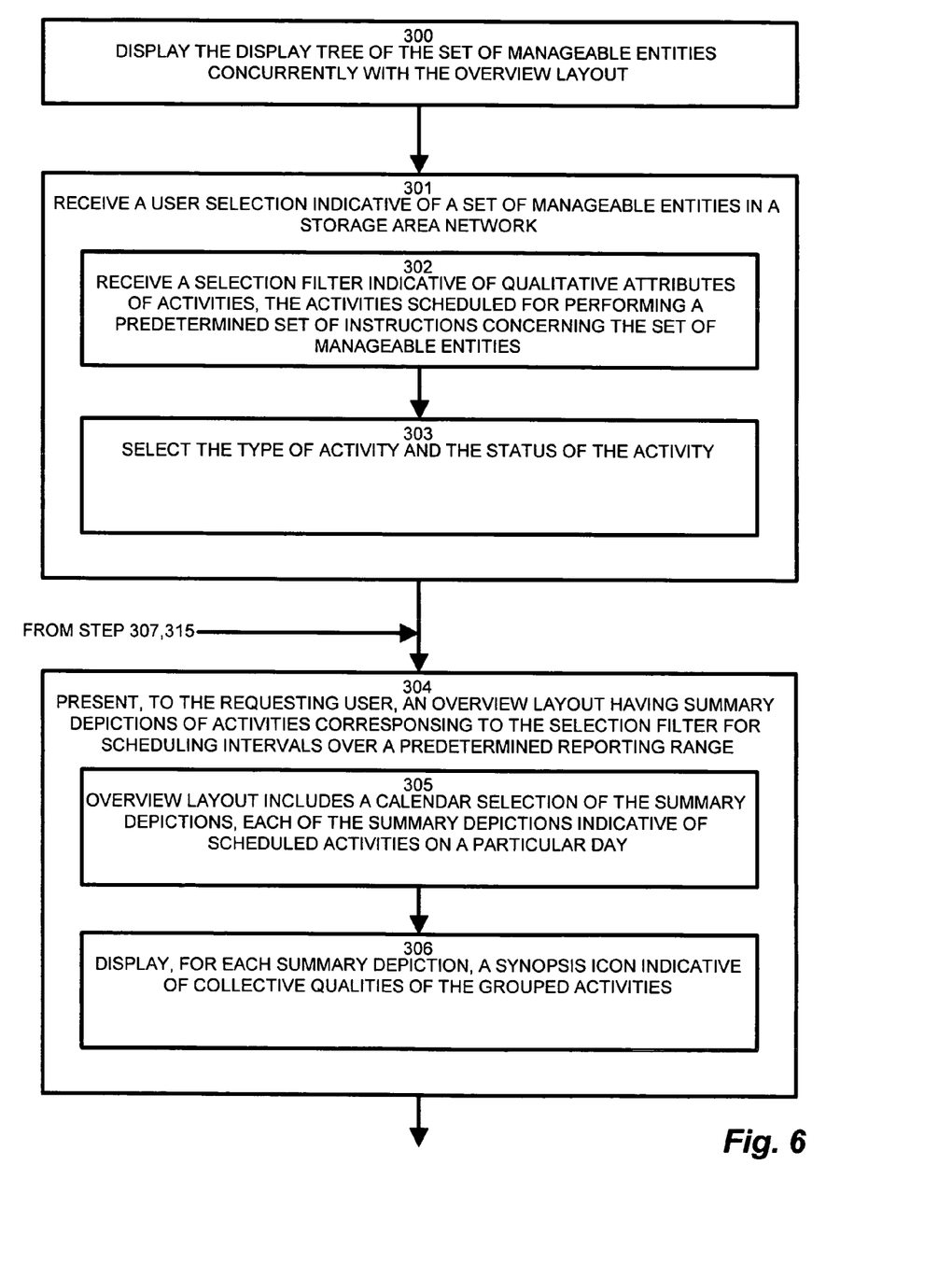
FIGS. 6-8 are a flowchart of scheduler operation using the GUI of FIGS. 4 and 5.
Figure 7:
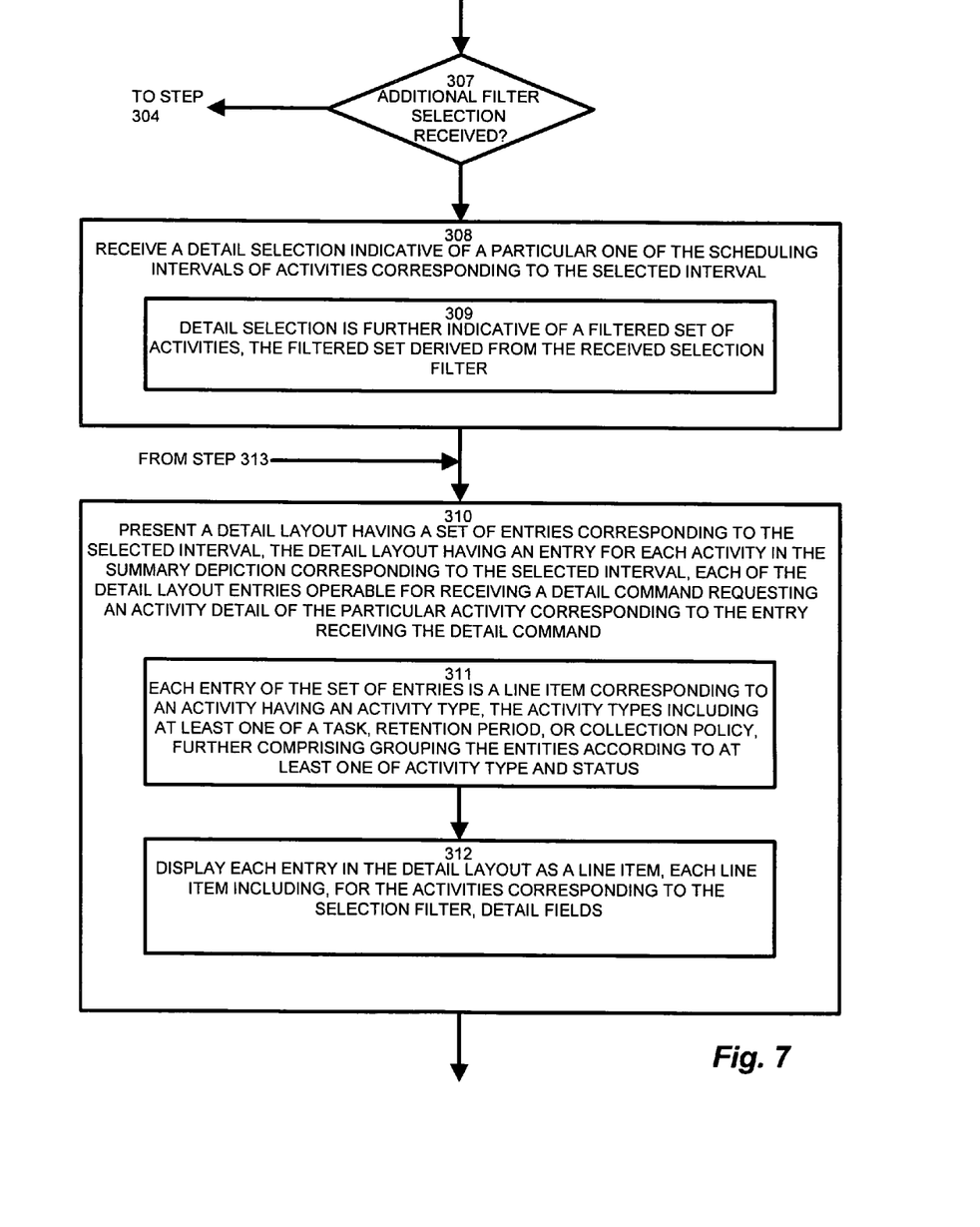
Figure 8:
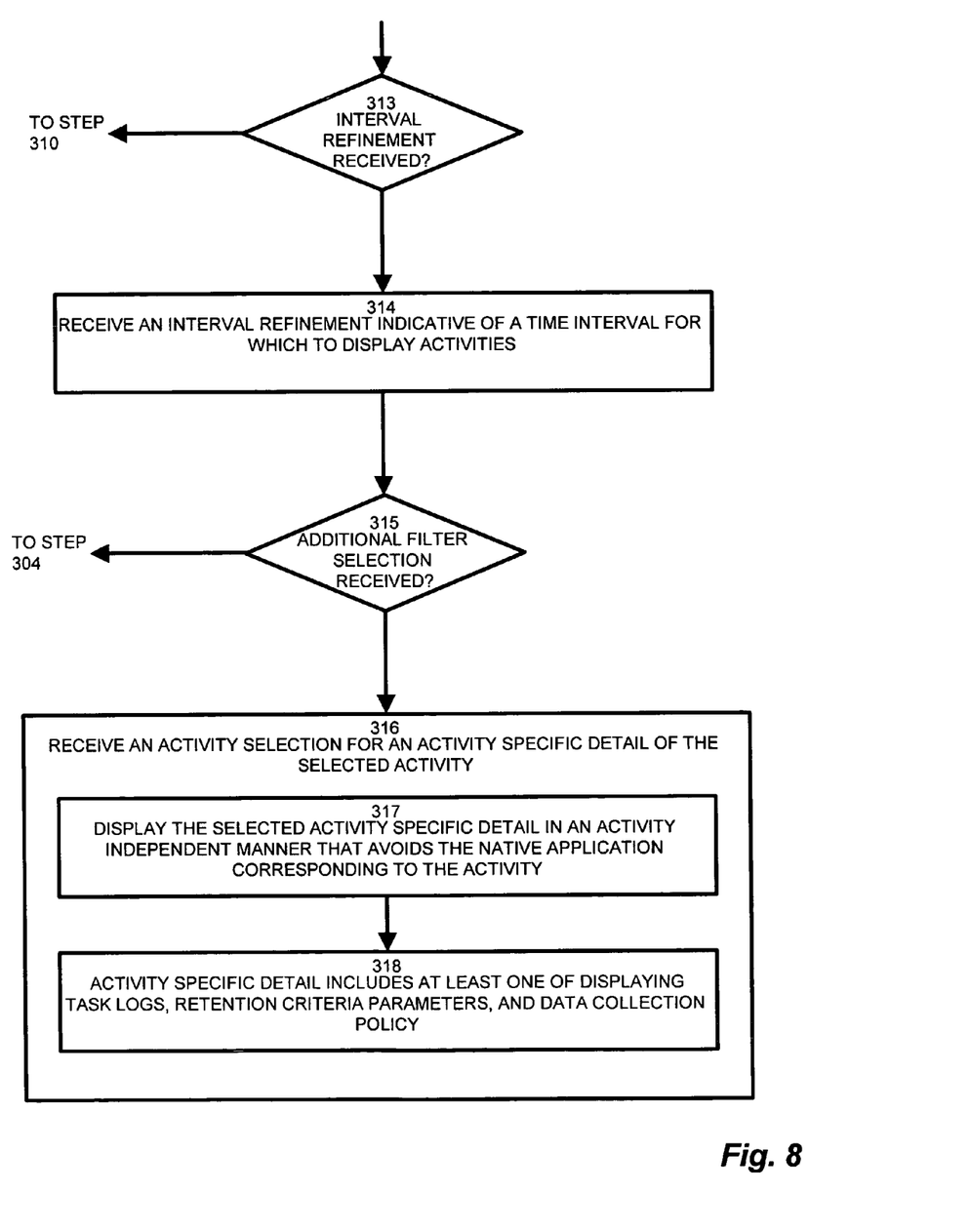

FIGS. 6-8 are a flowchart of scheduler operation using the GUI of FIGS. 4 and 5. Referring to FIGS. 4-8, in the exemplary configuration, a SAN operator or user employs the scheduler to manage scheduled activities via the GUI 122 at the console 124. At step 300, the scheduler 130 displays the display tree 500 of the set of manageable entities 112' concurrently with the overview layout 126-1. The scheduler 130 receives a user selection 140 indicative of a 112 set of manageable entities in a storage area network, as shown at step 301. The display tree 500 is an expandable, hierarchically nested selection of the manageable entities 112 available in the SAN 102. Manageable entities included within other manageable entities are displayable by expanding the individual manageable entities 112 in the tree 500. Upon selection, activities associated with the selection group 112' are available for display.

Based on the user selections in the type pulldown 502 and status pulldown 504, the scheduler 130 receives the selection filter 142 indicative of qualitative attributes of activities, as depicted at step 302, in which the activities scheduled perform a predetermined set of instructions concerning the set of manageable entities 112. Accordingly, receiving the selection filter 142 includes selecting the type of activity and the status of the activity via the pulldowns 502, 504, as shown at step 303.

The scheduler 130 presents, to the requesting user, the overview layout 126-1 having summary depictions 506 of activities corresponding to the selection filter 142 for scheduling intervals 508 over a predetermined reporting range in the overview layout 126-1, as depicted at step 304. Typically, the reporting range is monthly and the scheduling interval is daily, and may be further augmented by the interval filter 520, discussed further below. Therefore, the overview layout includes a calendar selection 510 of the summary depictions 506, in which each of the summary depictions 506 is indicative of scheduled activities on a particular day, as shown at step 305. The scheduler 130 further displays, for each summary depiction, the synopsis icon 512 indicative of collective qualities of the grouped activities, as depicted at step 306. The synopsis icon, therefore, indicates a collective aggregation of each of the activities it represents. For example, the synopsis icon 512 may indicate, for a selection filter 514 of successful status, whether all of the activities are successful or whether one or more failed.

Upon display of the detail layout 126-2, a user may select a refinement of the selection filter 142. At step 307 a check is performed to see if the user has clicked on the selection filter window 514 to reselect the selection criteria. If so, control reverts to step 304 to receive the new selection filter 142. Otherwise, the scheduler 130 receives a detail selection 146 indicative of a particular one of the scheduling intervals of activities corresponding to the selected interval, as depicted at step 308. The user selects the scheduling interval 508 by clicking on the corresponding summary depiction 506 (i.e. in the day of the calendar for which information is sought). The detail selection 146 is further indicative of the filtered set of activities, in which the filtered set derived from the received selection filter 142 specified in the selection filter window 514, as depicted at step 309.

The scheduler 130 presents, in the display window 124, the detail layout 126-2 having a set of entries 530-1 ... 530-N (i.e. line items) corresponding to the selected interval 508, such that the detail layout 126-2 has an entry 530 for each activity in the summary depiction 506 corresponding to the selected interval 508, as shown at step 310, shown by arrow 174. In the exemplary configuration, each entry 530 of the set of entries 530-1 ... 530-N is a line item corresponding to an activity having an activity type, in which the activity types include at least one of a task, retention period, or collection policy. Further, the detail display 126-2 groups the entities according to at least one of activity type and status, depending on the grouping window 516. Therefore, the detail display 126-2 displays each entry 530 in the detail layout 126-2 as a line item 530, such that each line item includes, for the activities corresponding to the selection filter 142, a detail field set 532 including detail fields 534-1 ... 534-N (534 generally), as depicted at step 312. Each of the detail layout entries 530 is operable to receive a detail command 146 requesting an activity detail of the particular activity corresponding to the entry 530 receiving the detail command 146. In other words, the operator can click on the line 530 of the activity for which additional information is requested, and then select the activity details button 522, discussed further below.

A check is performed, at step 313, to determine if an interval refinement has been received. If so, then the scheduler 130 receives an interval refinement 149 indicative of a time interval for which to display activities, as shown at step 314. The interval refinement 149 is selected via the interval filter 520, similarly as described above and control reverts to step 310 to display the detail layout 126-2 with the new interval.

If no interval refinement is received, then a check is performed to determine if additional selection filter 142 has been received, as depicted at step 315. If so, the control reverts to step 304 to apply the new selection filter 142. Otherwise, the user selects an activity for further investigation in the drill down display 126-3. Accordingly, at step 316, the scheduler receives an activity selection for an activity specific detail of the selected activity. The display window 124 employs the drill down display 126-3 for displaying activity specific details from the detail files 162, and displaying the selected activity specific detail in an activity independent manner that avoids the native application corresponding to the activity, as shown at step 317. In other words, the user need not exit the scheduler or execute another application specific to the type of scheduled activity, but rather may drill down seamlessly from the integrated scheduler 130 for receiving the requested activity specific detail. In the exemplary configuration, the activity specific detail may include a variety of detailed information about the scheduled activity (job) from within the same SAN management application, including but not limited to of displaying task logs, retention criteria parameters, commands associated with the activities, failure information which may be associated with the activities, and data collection policy, however alternate configurations may employ other detail files 162, as shown by arrow 176.

Those skilled in the art should readily appreciate that the programs and methods for managing scheduled activities as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for managing scheduled activities has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer-implemented method for viewing scheduled activities in which at least one computer system accesses instructions from computer storage and executes the instructions to perform steps comprising:

in a Storage Area Network (SAN) management application window, concurrently displaying a tree of SAN objects, an overview layout and a filter region, the tree of SAN objects being an expandable, nested hierarchy of SAN objects managed via the SAN management application;

receiving a user selection in the tree of SAN objects, the user selection indicative of a set of SAN objects managed via the SAN management application;

in the filter region, receiving a first selection filter indicative of qualitative attributes of SAN object activities, the SAN object activities scheduled for performing a predetermined set of instructions concerning the set of SAN objects during a predetermined reporting range, wherein receiving the first filter selection includes: selecting a type of SAN object activity and a status of the SAN object activity;

refreshing the overview layout to present multiple summary depictions of SAN object activities that corresponding to the first selection filter, each of the summary depictions providing a representation of least one SAN object activity scheduled to occur during a respective scheduling interval within the predetermined reporting range;

receiving a selection of a scheduling interval currently displayed in the refreshed overview layout;

replacing display of the refreshed overview layout with display of a detail layout while maintaining display of the tree of SAN objects and the filter region in the SAN management application window;

associating the filter region with the detail layout to allow a user to apply a second selection filter from the filter region to at least one entry in a set of entries presented by the detail layout, each entry representing a SAN object activity from a summary depiction occurring within the selected scheduling interval, each of the entries operable for receiving a detail command requesting an activity detail of a corresponding SAN object, wherein each entry is a line item corresponding to an SAN object activity having a SAN object activity type, the SAN object activity types including at least one of a task, retention period, or collection policy, further comprising grouping the entities according to at least one of activity type and status; and wherein refreshing the overview layout further comprises:
for each summary depiction, displaying a synopsis icon indicating whether all of the SAN object activities in the respective summary depiction are successful;
wherein associating the filter region with the detail layout to allow the user to apply the second selection filter from the filter region to at least one entry in the set of entries presented by the detail layout includes:
identifying a currently displayed portion of the filter region, the filter region further (i) displaying at least one filter region control and (ii) providing a display of a selectable tab for accessing a topological view of the Storage Area Network; and
upon presenting the detail layout, inserting at least one selectable menu into the currently displayed portion of the filter region while the filter region maintains display of the filter region control and the selectable tab, the selectable menu providing at least one selectable search criteria for defining the second selection filter.

2. The computer-implemented method of claim 1 further comprising displaying each entry in the detail layout as a line item, each line item including, for the SAN object activities corresponding to the selection filter, detail fields.

3. The computer-implemented method of claim 2 further comprising receiving an interval refinement indicative of a time interval for which to display SAN object activities.

4. The computer-implemented method of claim 3 further comprising:
receiving an activity selection for an activity specific detail of the selected activity; and
displaying the selected activity specific detail in an activity independent manner that avoids the native application corresponding to the activity.

5. The computer-implemented method of claim 4 wherein the activity specific detail includes at least one of displaying task logs, retention criteria parameters, commands associated with the activities, failure information which may be associated with the activities, and data collection policy parameters.

6. The computer-implemented method as in claim 1, wherein grouping the entities according to at least one of activity type and status, includes:
grouping activities according to a task type group; and
grouping activities in the task type group according to at least one status group.

7. The computer-implemented method as in claim 1, wherein presenting the overview layout having multiple summary depictions includes:
presenting multiple scheduling intervals in a calendar view of the overview layout, each scheduling interval corresponding to a particular day in the calendar view, wherein presenting multiple scheduling intervals includes concurrently presenting:
(i) a first scheduling interval including a display of a first summary depiction and a display of a first synopsis icon indicating whether all of the SAN object activities in the first summary depiction are successful; and
(ii) a second scheduling interval including a display of a second summary depiction and a display of a second synopsis icon indicating whether all of the SAN object activities in the second summary depiction are successful.

8. The computer-implemented method as in claim 1, comprising:
wherein receiving the selection filter includes receiving a selection of a first type of SAN object activity;
wherein presenting the overview layout having summary depictions of SAN object activities includes:
(i) displaying a first scheduling interval representing a day in a calendar view of the overview layout;
(ii) displaying a first summary depiction within display of the first scheduling interval, the first summary depiction indicative of grouped SAN object activities of a first type scheduled for the day represented by the first scheduling interval; and
(iii) displaying a first synopsis icon within the first scheduling interval, the first synopsis icon indicating whether all SAN object activities of the first type in the first summary depiction are successful.

9. The computer-implemented method as in claim 8, comprising:
receiving a selection of a second type of activities in the selection filter;
receiving a selection of a refresh button;
in response to the selection of the refresh button, within the calendar view:
(i) replacing display of the first summary depiction with a display of a second summary depiction in the first scheduling interval, the second summary depiction indicative of grouped activities of the second type scheduled for the day represented by the first scheduling interval; and
(ii) replacing display of the first synopsis icon with a display of a second synopsis icon within the first scheduling interval, the second synopsis icon indicating whether all grouped activities of the second type in the second summary depiction are successful.

10. The computer-implemented method as in claim 1, wherein inserting at least one selectable menu into the currently displayed portion of the filter region includes:
upon presenting the detail layout:
generating at least one drop-down menu to be included in the currently displayed portion of the filter region, the drop-down menu including at least one first selectable sorting criteria to be applied to the set of entries via the second selection filter, the at least one first selectable sorting criteria corresponding to a first attribute of the set of entries presented in the detail layout;
rendering the drop-down menu; and
inserting the drop-down menu into the currently displayed portion of the filter region while maintaining (i) display of filter region control and (ii) the selectable tab in the filter region.

11. The computer-implemented method of claim 10, wherein associating the filter region with the detail layout includes:
identifying a second selectable sorting criteria offered in the filter region control, the filter region displaying the second selectable sorting criteria before the drop-down menu is rendered, the second selectable sorting criteria corresponding to a SAN object activity type currently indicated in at least one respective summary depiction; and
as the drop-down menu is inserted into the visible portion of the filter region, replacing the display of second selectable sorting criteria with a display of a third selectable sorting criteria in the filter region control, the third selectable sorting criteria corresponding to a second attribute of the set of entries presented in the detail layout.

12. A storage area network (SAN) management server for viewing scheduled activities in a SAN comprising:
a SAN management application window concurrently displaying a tree of SAN objects, an overview layout and a filter region, the tree of SAN objects being an expandable, nested hierarchy of SAN objects managed via the SAN management application, the overview layout and the filter region each displayed on a display screen;

a SAN tree module for receiving a user selection in the tree of SAN objects, the user selection indicative of a set of SAN objects managed via the SAN management application;

a filter module receiving a first selection filter in the filter region, the filter region indicative of qualitative attributes of SAN object activities, the SAN object activities scheduled for performing a predetermined set of instructions concerning the set of SAN objects during a predetermined reporting range, wherein receiving the first selection filter includes: selecting a type of SAN object activity and a status of the SAN object activity;

an overview display module to refresh the overview layout to present multiple summary depictions of SAN object activities that corresponding to the first selection filter, each of the summary depictions providing a representation of least one SAN object activity scheduled to occur during a respective scheduling interval within the predetermined reporting range;

a interval module for receiving a selection of a scheduling interval currently displayed in the refreshed overview layout;

a detail display module to replace display of the refreshed overview layout with display of a detail layout while maintaining display of the tree of SAN objects and the filter region in the SAN management application window, wherein the detail display module and the filter module associate the filter region with the detail layout to allow a user to apply a second selection filter from the filter region to at least one entry in a set of entries presented by the detail layout, each entry representing a SAN object activity from a summary depiction occurring within the selected scheduling interval, each of the entries operable for receiving a detail command requesting an activity detail of a corresponding SAN object, wherein each entry is a line item corresponding to an SAN object activity having a SAN object activity type, the SAN object activity types including at least one of a task, retention period, or collection policy, further comprising grouping the entities according to at least one of activity type and status; and wherein refreshing the overview layout further comprises:

for each summary depiction, displaying a synopsis icon indicating whether all of the SAN object activities in the respective summary depiction are successful;

wherein the detail display module and the filter module associate the filter region by:

identifying a currently displayed portion of the filter region, the filter region further (i) displaying at least one filter region control and (ii) providing a display of a selectable tab for accessing a topological view of the Storage Area Network; and upon presenting the detail layout, inserting at least one selectable menu into the currently displayed portion of the filter region while the filter region maintains display of the filter region control and the selectable tab, the selectable menu providing at least one selectable search criteria for defining the second selection filter.

13. The management server of claim 12 wherein the detail layout is further operable to display each entry in the detail layout as a line item, each line item including, for the SAN object activities corresponding to the selection filter, detail fields.

14. The management server of claim 13 wherein the GUI is further operable to receive an interval refinement indicative of a time interval for which to display SAN object activities.

15. The management server of claim 14 wherein the GUI is further operable to:

receive an activity selection for an activity specific detail of the selected activity; and display the selected activity specific detail in an activity independent manner that avoids the native application corresponding to the activity, wherein the activity specific detail includes at least one of displaying task logs, retention criteria parameters, commands associated with the activities, failure information which may be associated with the activities, and data collection policy parameters.

16. A computer program product having a computer readable medium operable to store computer program logic embodied in computer program code encoded thereon for managing scheduled activities comprising:

computer program code for concurrently displaying a tree of SAN objects, an overview layout and a filter region in a Storage Area Network (SAN) management application window, the tree of SAN objects being an expandable, nested hierarchy of SAN objects managed via the SAN management application;

computer program code for receiving a user selection in the tree of SAN objects, the user selection indicative of a set of SAN objects managed via the SAN management application;

computer program code for receiving a first selection filter in the filter region, the first selection filter indicative of qualitative attributes of SAN object activities, the SAN object activities scheduled for performing a predetermined set of instructions concerning the set of SAN objects during a predetermined reporting range, wherein receiving the first selection filter includes: selecting a type of SAN object activity and a status of the SAN object activity;

computer program code for refreshing the overview layout to present multiple summary depictions of SAN object activities that corresponding to the first selection filter, each of the summary depictions providing a representation of least one SAN object activity scheduled to occur during a respective scheduling interval within the predetermined reporting range;

computer program code for receiving a selection of a scheduling interval currently displayed in the refreshed overview layout;

computer program code for replacing display of the refreshed overview layout with display of a detail layout while maintaining display of the tree of SAN objects and the filter region in the SAN management application window;

computer program code for associating the filter region with the detail layout to allow a user to apply a second selection filter from the filter region to at least one entry in a set of entries presented by the detail layout, each entry representing a SAN object activity from a summary depiction occurring within the selected scheduling interval, each of the entries operable for receiving a detail command requesting an activity detail of a corresponding SAN object, wherein each entry is a line item corresponding to an SAN object activity having a SAN object activity type, the SAN object activity types including at least one of a task, retention period, or collection policy, further comprising grouping the entities according to at least one of activity type and status; and wherein the computer program code for refreshing the overview layout further comprises:

computer program code for displaying a synopsis icon for each summary depiction, the synopsis icon indicating whether all of the SAN object activities in the respective summary depiction are successful;

wherein the computer program code for associating the filter region with the detail layout to allow the user to apply the second selection filter from the filter region to at least one entry in the set of entries presented by the detail layout includes computer program code for:

identifying a currently displayed portion of the filter region, the filter region further (i) displaying at least one filter region control and (ii) providing a display of a selectable tab for accessing a topological view of the Storage Area Network; and upon presenting the detail layout, inserting at least one selectable menu into the currently displayed portion of the filter region while the filter region maintains display of the filter region control and the selectable tab, the selectable menu providing at least one selectable search criteria for defining the second selection filter.

17. A storage area network (SAN) management server for viewing scheduled activities in a SAN comprising:

means for concurrently displaying a tree of SAN objects, an overview layout and a filter region in a Storage Area Network (SAN) management application window, the tree of SAN objects being an expandable, nested hierarchy of SAN objects managed via the SAN management application, the overview layout and the filter region each displayed on a display screen;

means for receiving a user selection in the tree of SAN objects, the user selection indicative of a set of SAN objects managed via the SAN management application;

means for receiving a first selection filter in the filter region, the first selection filter indicative of qualitative attributes of SAN object activities, the SAN object activities scheduled for performing a predetermined set of instructions concerning the set of SAN objects during a predetermined reporting range, wherein receiving the first selection filter includes: selecting a type of SAN object activity and a status of the SAN object activity;

means for refreshing the overview layout to present multiple summary depictions of SAN object activities that corresponding to the first selection filter, each of the summary depictions providing a representation of least one SAN object activity scheduled to occur during a respective scheduling interval within the predetermined reporting range;

means for receiving a selection of a scheduling interval currently displayed in the refreshed overview layout;

means for replacing display of the refreshed overview layout with display of a detail layout while maintaining display of the tree of SAN objects and the filter region in the SAN management application window;

means for associating the filter region with the detail layout to allow a user to apply a second selection filter from the filter region to at least one entry in a set of entries presented by the detail layout, each entry representing a SAN object activity from a summary depiction occurring within the selected scheduling interval, each of the entries operable for receiving a detail command requesting an activity detail of a corresponding SAN object, wherein each entry is a line item corresponding to an SAN object activity having a SAN object activity type, the SAN object activity types including at least one of a task, retention period, or collection policy, further comprising grouping the entities according to at least one of activity type and status; and wherein the means for refreshing the overview layout further comprises:

means for displaying a synopsis icon for each summary depiction, the synopsis icon indicating whether all of the SAN object activities in the respective summary depiction are successful;

wherein means for associating the filter region with the detail layout to allow the user to apply the second selection filter from the filter region to at least one entry in the set of entries presented by the detail layout includes means for:

identifying a currently displayed portion of the filter region, the filter region further (i) displaying at least one filter region control and (ii) providing a display of a selectable tab for accessing a topological view of the Storage Area Network; and upon presenting the detail layout, inserting at least one selectable menu into the currently displayed portion of the filter region while the filter region maintains display of the filter region control and the selectable tab, the selectable menu providing at least one selectable search criteria for defining the second selection filter.

\* \* \* \* \*

UNITED STATES PATENT AND TRADEMARK OFFICE
CERTIFICATE OF CORRECTION

| | | |
|---|---|---|
| PATENT NO. | : 7,895,520 B1 | Page 1 of 1 |
| APPLICATION NO. | : 11/324842 | |
| DATED | : February 22, 2011 | |
| INVENTOR(S) | : Serena M. Doyle et al. | |

It is certified that error appears in the above-identified patent and that said Letters Patent is hereby corrected as shown below:

Title Page; item (73); insert;

--(73) Assignee: EMC Corporation, Hopkinton, MA (US)--

Signed and Sealed this

Thirteenth Day of September, 2011

David J. Kappos
*Director of the United States Patent and Trademark Office*